(12) United States Patent
Rijavec

(10) Patent No.: US 8,314,949 B2
(45) Date of Patent: Nov. 20, 2012

(54) DISTRIBUTED GLOBAL OBJECT CACHE

(75) Inventor: Nenad Rijavec, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 1001 days.

(21) Appl. No.: 12/342,706

(22) Filed: Dec. 23, 2008

(65) Prior Publication Data

US 2010/0157358 A1    Jun. 24, 2010

(51) Int. Cl.
*H04N 1/00* (2006.01)
*G06K 15/00* (2006.01)
*G06F 3/12* (2006.01)

(52) U.S. Cl. ....... 358/1.13; 358/402; 358/403; 358/404; 358/1.14; 358/1.15; 358/1.16

(58) Field of Classification Search .................. None
See application file for complete search history.

(56) References Cited

U.S. PATENT DOCUMENTS

| | | | |
|---|---|---|---|
| 6,026,474 | A | 2/2000 | Carter et al. |
| 6,108,754 | A | 8/2000 | Lindholm |
| 6,996,674 | B2 | 2/2006 | Chiu et al. |
| 7,333,115 | B2 | 2/2008 | Yamaguchi |
| 2002/0166031 | A1 | 11/2002 | Chen et al. |
| 2004/0044866 | A1 | 3/2004 | Casazza |
| 2004/0156075 | A1 | 8/2004 | Hohensee et al. |
| 2004/0247206 | A1* | 12/2004 | Kaneda et al. .................. 382/305 |
| 2005/0283573 | A1 | 12/2005 | Mewhinney et al. |
| 2007/0081190 | A1 | 4/2007 | Prosi |
| 2008/0055621 | A1* | 3/2008 | Price et al. .................. 358/1.13 |

OTHER PUBLICATIONS

Leff et al., "Replication Algorithms in a Remote Caching Architecture", IEEE Transactions on Parallel and Distributed Systems, vol. 4, No. 11, Nov. 1993, pp. 1185-1205.
Adya et al., "Fragment Reconstruction: Providing Global Cache Coherence in a Transactional Storage System", Distributed Computing Systems, 1997, Proceedings of the 17th Int'l Conference, pp. 2-11.
Gadde et al., "Reduce, Reuse, Recycle: An Approach to Building Large Internet Caches", Operating Systems, 1997, The Sixth Workshop on Hot Topics, pp. 93-98.
Holmedahl et al., "Cooperative Caching of Dynamic Content on a Distributed Web Server", High Performance Distributed Computing, 1998, Proceedings, The Seventh Int'l Symposium, pp. 1-8.
Tari et al., "Cache Management in CORBA Distributed Object Systems", Concurrency, IEEE vol. 8, Issue 3, Jul.-Sep. 2000, pp. 48-55.
Hagimont et al., "A Configurable RMI Mechanism for Sharing Distributed Java Objects", Internet Computing, IEEE vol. 5, Issue 1, Jan.-Feb. 2001, pp. 36-43.

(Continued)

*Primary Examiner* — Benny Q Tieu
*Assistant Examiner* — Haris Sabah
(74) *Attorney, Agent, or Firm* — Blakely, Sokoloff, Taylor & Zafman LLP

(57) ABSTRACT

A method is disclosed. The method includes receiving an object at a first image transform within a control unit, the first image transform searching for the object in a local cache, retrieving the object from a second image transform upon a determination that the object been previously received at the control unit and processed at the second image transform; and the first image transform performing a raster image process on the object upon a determination that the object has not been previously received at the control unit.

20 Claims, 4 Drawing Sheets

OTHER PUBLICATIONS

Santoro et al., "Two-Tier Cooperation: A Scalable Protocol for Web Cache Sharing", Network Computing and Applications, 2001. NCA 2001. IEEE Int'l Symposium, pp. 186-193.

Poleggi et al., Global Caching Mechanism in Clusters of Web Servers, Modeling, Analysis and Simulation of Computer and Telecom. Systems, 2002. MASCOTS 2002, Proceedings. 10th IEEE Int'l Symposium, pp. 421-426.

Liu et al., "On Peer-to-Peer Client Web Cache Sharing", Communications, 2005, ICC 2005, 2005 IEEE International Conference, vol. 1, pp. 306-310.

Samarasinghe et al., "Optimizing the Access Performance and Data Freshness of Distributed Cache Objects Considering User Access Patterns", Advanced Info. Networking and Applications, 2005. ANIA 2005. 19th Int'l Conference vol. 2, pp. 325-328.

Wijesundara et al., "An Object Replacement Strategy for Global Performance in Distributed Web Caching", Communication Technology Proceedings, 2003. ICCT 2003. Int'l Conference vol. 2, pp. 1687-1690.

Ding et al, "Improving Effective Bandwidth through Compiler Enhancement of Global Cache Reuse", Parallel and Distributed Processing Symposium, Proceedings 15th Int'l Conference pp. 1-10.

\* cited by examiner

DISTRIBUTED GLOBAL OBJECT CACHE

FIELD OF THE INVENTION

This invention relates generally to the field of printing systems. More particularly, the invention relates to image processing in a printing system.

BACKGROUND

Print systems include presentation architectures that are provided for representing documents in a data format that is independent of the methods that are utilized to capture or create those documents. One example of an exemplary presentation system, which will be described herein, is the (Advanced Function Presentation) AFP™ system developed by International Business Machines Corporation. According to the AFP system, documents may include combinations of text, image, graphics, and/or bar code objects in device and resolution independent formats. Documents may also include and/or reference fonts, overlays, and other resource objects, which are required at presentation time to present the data properly.

Once the documents are received at a printer, processing is performed to convert a document into a printable format. However, processing high-resolution images in an incoming data stream into a printable format typically involves highly compute-intensive operations (e.g., scaling, rotation, decompression, color conversion, etc.).

Further, it is common for a printer to frequently process repetitive images throughout a print job. For instance, a print job may include a full-page background image or a company logo that appears on every printed page. While some data streams, such as AFP, allow a print job generator to explicitly identify such an image, download the image once and then reuse it, some other data streams do not. Moreover, the print job generators may not use the capability even if present. Therefore, inefficiency occurs in having to repeatedly process the same images into a printable form.

As a result, a mechanism to store and reuse processed images is desired.

SUMMARY

In one embodiment, a method is disclosed. The method includes receiving an object at a first image transform within a control unit, the first image transform searching for the object in a local cache, retrieving the object from a second image transform upon a determination that the object been previously received at the control unit and processed at the second image transform; and the first image transform performing a raster image process on the object upon a determination that the object has not been previously received at the control unit.

In another embodiment, a printing system is disclosed. The printing system includes a print server and a printer. The printer includes a print head and a control unit having a cache master transform, a second image transform and a first image transform. The first image transform searches for a received object in a local cache, retrieves the object from the second image transform upon a determination that the object been previously received at the control unit and processed at the second image transform and performs a raster image process on the object upon a determination that the object has not been previously received at the control unit.

A further embodiment discloses an article of manufacture comprising a machine-readable medium including data that, when accessed by a machine, cause the machine to perform operations comprising receiving an object at a first image transform within a control unit, the first image transform searching for the object in a local cache, retrieving the object from a second image transform upon a determination that the object been previously received at the control unit and processed at the second image transform; and the first image transform performing a raster image process on the object upon a determination that the object has not been previously received at the control unit.

BRIEF DESCRIPTION OF THE DRAWINGS

A better understanding of the present invention can be obtained from the following detailed description in conjunction with the following drawings, in which.

DETAILED DESCRIPTION

A mechanism to efficiently process images in a print system is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
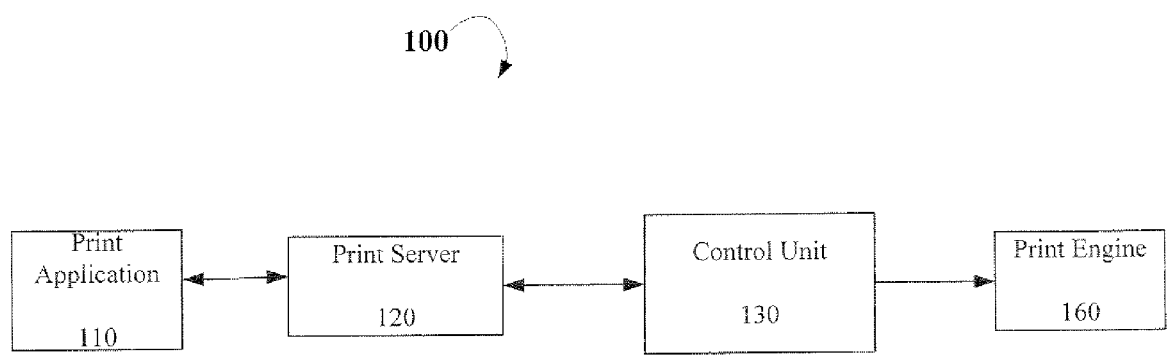
FIG. 1 illustrates one embodiment of a printing system.

FIG. 1 illustrates one embodiment of a printing system 100. Printing system 100 includes a print application 110, a server 120, a control unit 130 and a print engine 160. Print application 110 makes a request for the printing of a document. In one embodiment, print application 110 provides a Mixed Object Document Content Architecture (MO:DCA) data stream to print server 120.

In other embodiments print application 110 may also provide PostScript (P/S) and PDF files for printing. P/S and PDF files are printed by first passing them through a pre-processor (not shown), which creates resource separation and page independence so that the P/S or PDF file can be transformed into an AFP MO:DCA data stream prior to being passed to print server 120.

According to one embodiment, the AFP MO:DCA data streams are object-oriented streams including, among other things, data objects, page objects, and resource objects. In a further embodiment, AFP MO:DCA data streams include a Resource Environment Group (REG) that is specified at the beginning of the AFP document, before the first page. When the AFP MO:DCA data streams are processed by print server 120, the REG structure is encountered first and causes the server to download any of the identified resources that are not already present in the printer. This occurs before paper is moved for the first page of the job. When the pages that require the complex resources are eventually processed, no additional download time is incurred for these resources.

Print server 120 processes pages of output that mix all of the elements normally found in presentation documents, e.g., text in typographic fonts, electronic forms, graphics, image, lines, boxes, and bar codes. The AFP MO:DCA data stream is composed of architected, structured fields that describe each of these elements.

In one embodiment, print server 120 communicates with control unit 130 via an Intelligent Printer Data Stream (IPDS). The IPDS data stream is similar to the AFP data steam, but is built specific to the destination printer in order to integrate with each printer's specific capabilities and command set, and to facilitate the interactive dialog between the print server 120 and the printer. The IPDS data stream may be built dynamically at presentation time, e.g., on-the-fly in real time. Thus, the IPDS data stream is provided according to a device-dependent bi-directional command/data stream.

According to one embodiment, control unit 130 process and renders objects received from print server and provides sheet maps for printing to print engine 160. In such an embodiment, control unit 130 includes a multitude (e.g., ten) of compute node machines, with each node having two or more parallel page output handlers (POH's). In one embodiment, each POH includes a separate transform that processes received objects. In such an embodiment, the transforms process image objects. However, in other embodiments, the transforms may process any type of data object received at control unit 130.

Figure 2:
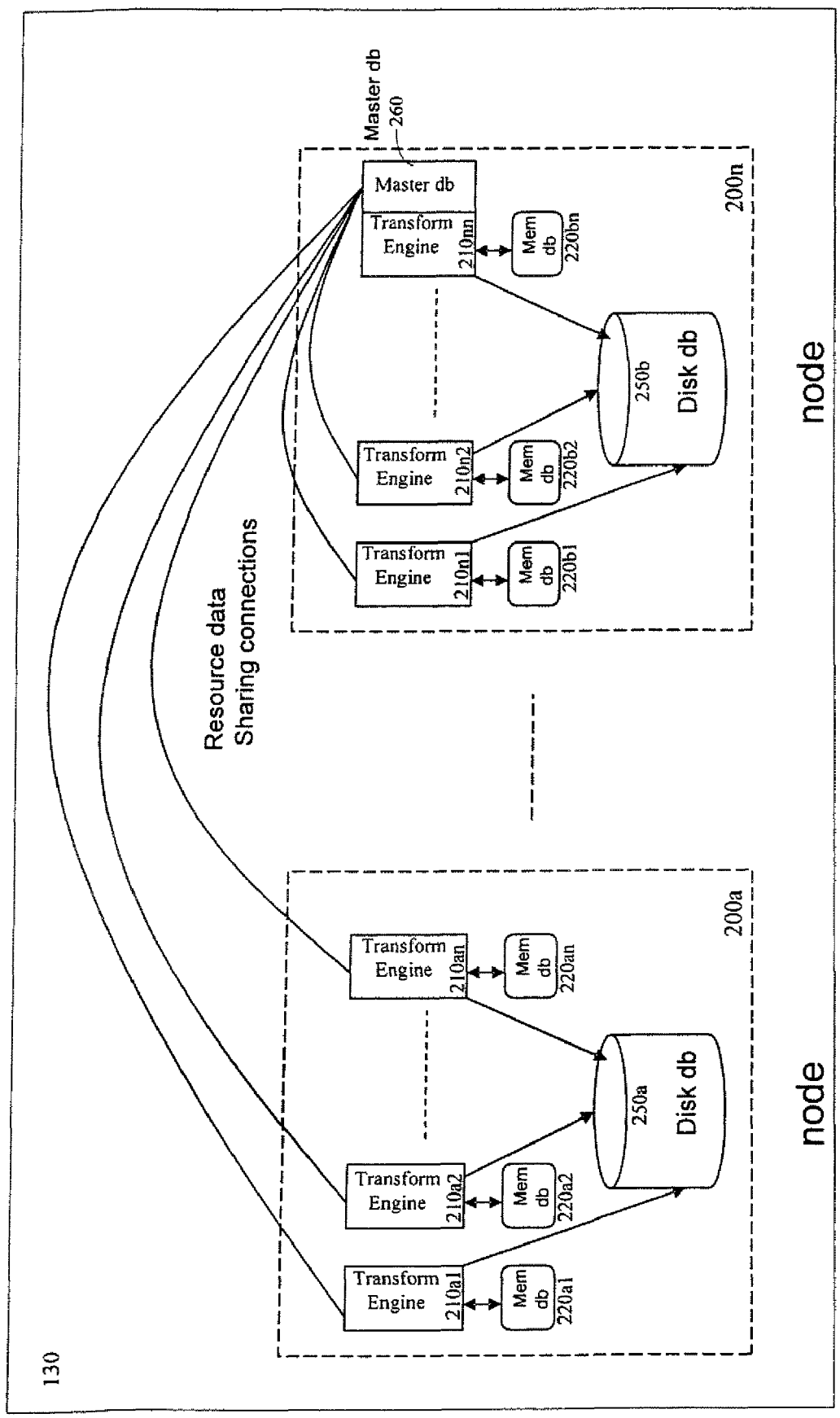
FIG. 2 illustrates one embodiment of a control unit.

FIG. 2 illustrates one embodiment of a control unit 130 including compute nodes 200a-200n. As shown in FIG. 2, node 200a includes transform engines (transforms) 210a1-210an, while node 200n includes transforms 210n1-210nn. In one embodiment, each transform 210 includes an associated memory database (or local cache) 220 that caches image objects that a corresponding transform 210 encounters more than once.

Figure 3:
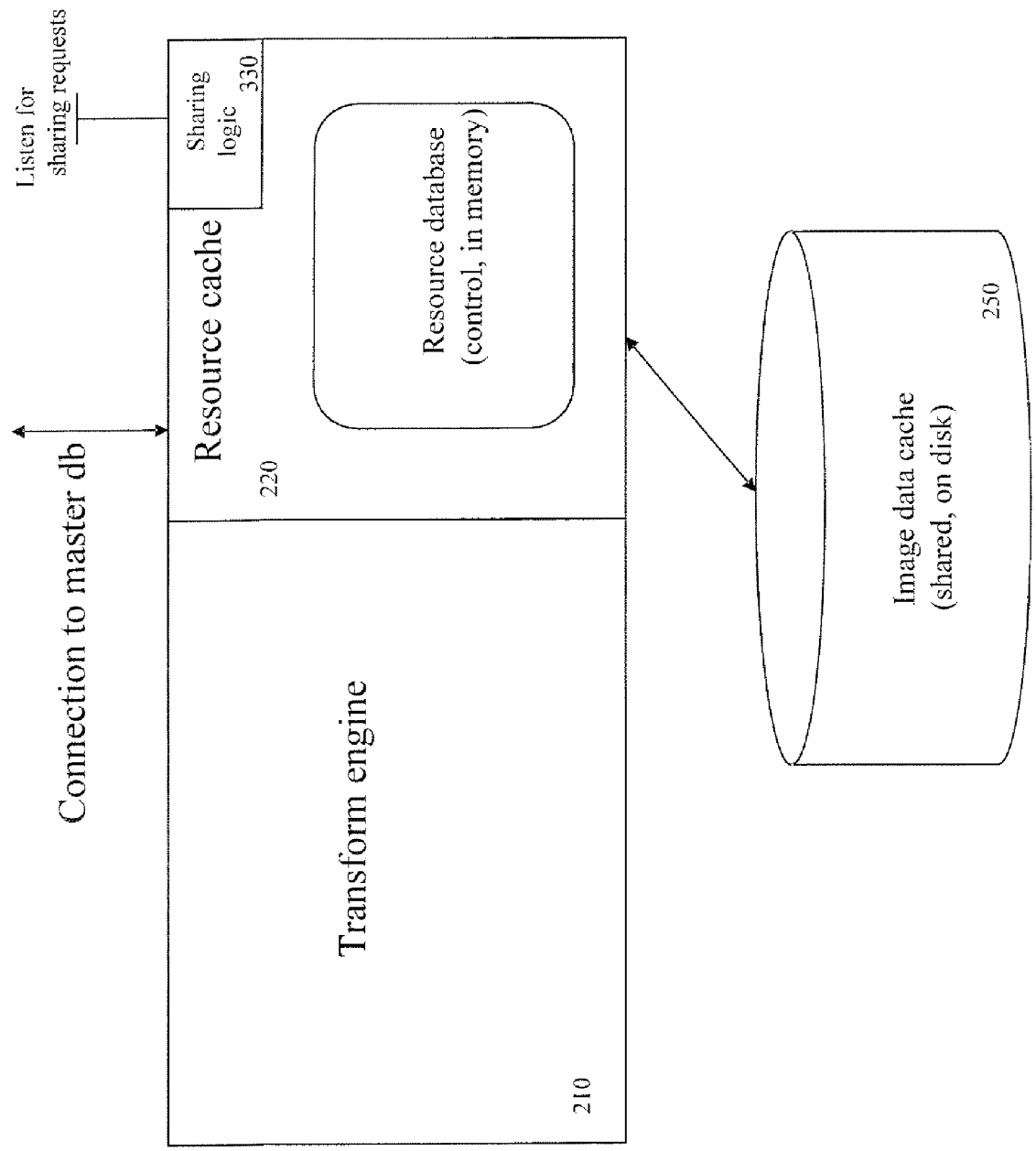
FIG. 3 illustrates one embodiment of a computer node.

FIG. 3 illustrates another embodiment of compute node 200 showing a single transform 210 and local cache 220. According to one embodiment, each object received at control unit 130 is tagged with a unique identifier (UID). In one embodiment, the UID is a Message-Digest algorithm 5 (MD5) encryption based on processing parameters, data length and a data MD5 hash. In addition to the UID, each object includes control information and data.

In one embodiment, the control information is relatively small (e.g., less than 200 bytes) and describes the object's dimensions and placement. Since the control information is relatively small, the control information and UID for an object is stored in the local cache 220 associated with the transform 210 processed the object. Meanwhile, the object data is stored at a disk database 250 since the data is typically large. Disk database 250 is central to each of the transforms 210 at node 200, and thus stores data for objects processed by all of the transforms 210.

According to one embodiment, control unit 130 implements a global caching mechanism to enable local caches 220 to globally share information and cached objects with other transforms within a node 200, as well as other nodes 200. Referring back to FIG. 2 for example, local cache 210a1 may share with either transform 210a2 or transform 210n1. In order to implement the global caching mechanism, a transform 210 is designated as a master (or "cache master") (e.g., transform 210mn in FIG. 2). The cache master maintains a master database 260 which stores a type and UID for each object, in addition to location information.

In one embodiment, the cache master knows all objects that have been received (or seen) at least once at control unit 130. This information is stored at master database 260. Thus, if an object is cached (or is being cached), the cache master knows which transform 210 has the object in its cache 220, or is currently caching it. In a further embodiment, the cache master also knows which transforms 210 are located on the same compute node 200 based on their IP numbers. This knowledge can be used to speed the cache sharing since all of the transforms 210 on the same node 200 share the same disk cache 250.

In one embodiment, each transform 210 remains ready to share its resource in order to share information. Thus, each transform 210 includes sharing logic 330 (FIG. 3) that listens to a port and waits for sharing requests. In one embodiment, the transform 210 performs synchronization after listening is started. If the transform 210 is not the cache master, the transform 210 opens a socket to the cache master on the sharing port and sends a registration message with its IP number and sharing port. This socket will remain open to query and inform the cache master regarding objects that the transform 210 has seen.

According to one embodiment, the cache master initiates a master thread. In such an embodiment, the master thread may be started either if the cache master determines that it is the master (e.g., based on the synchronization), or if the cache master receives a first master connection from a non-master. In a further embodiment, the master cache is also a "non-master", meaning that the cache master also operates as a regular transform 210 that needs to communicate with master database 260. In still a further embodiment, the cache master uses direct application programming interface (API) calls to communicate with the master database 260 rather than via a socket.

In one embodiment, a select call is used to wait for data on the open sockets (one per transform 210). Once there is data available, the master cache checks each socket in turn and processes the requests before blocking on select again. If the other transform 210 is located at the same node 200, there is no need to send the data since the object is already available on the local disk 250 servicing each transform 210 on the node.

Upon startup neither the cache master nor any of the transforms 210 knows how many transforms 210 that are available in control unit 130. Thus in one embodiment, the cache master relies on control unit 130 to not process any jobs until all the POHs are operating. As a result, the first time the cache master receives a message indicating that an object has been seen, it can assume that all the transform instances have registered with it.

Figure 4:
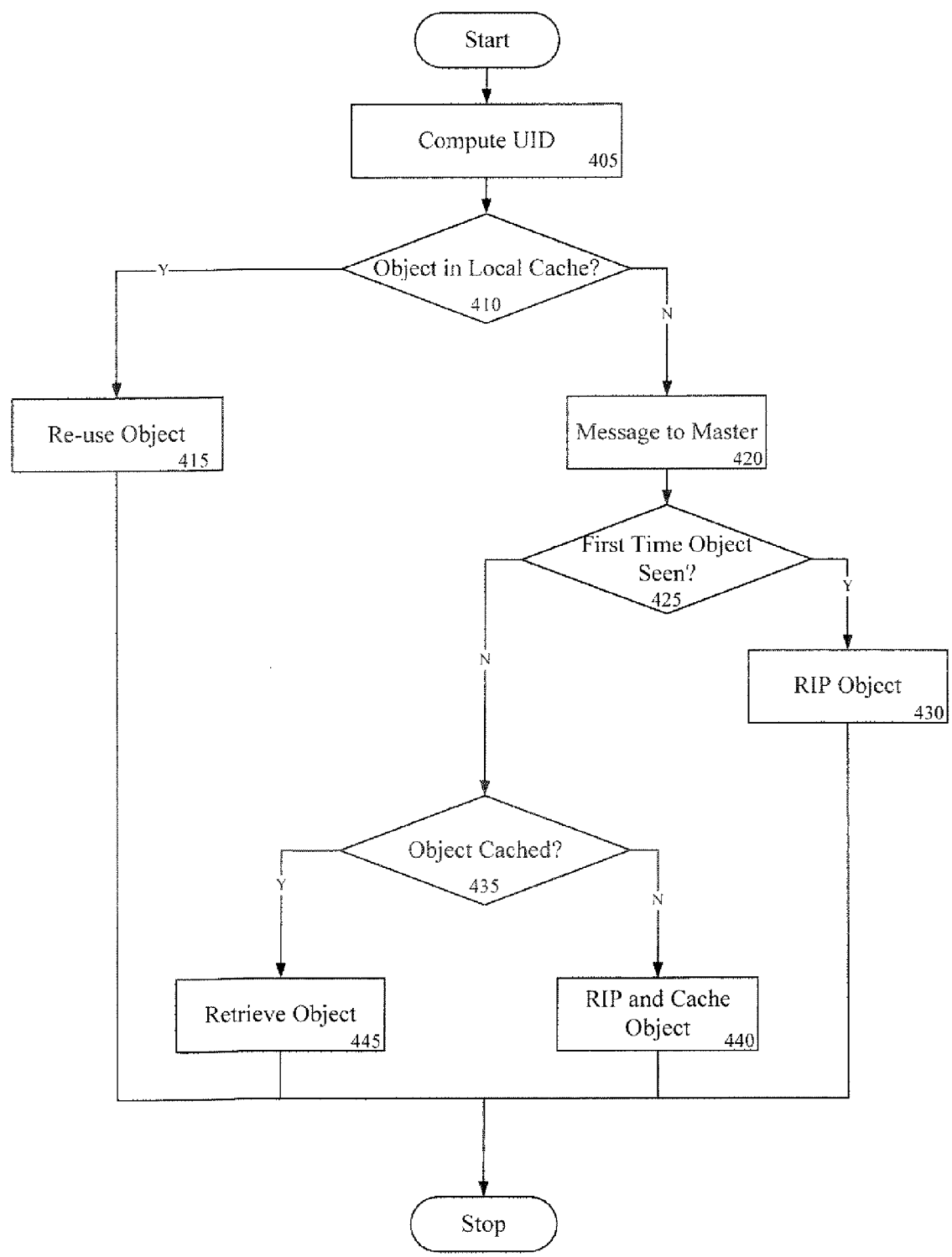
FIG. 4 is a flow diagram illustrating one embodiment of the operation of a control unit.

FIG. 4 is a flow diagram illustrating the operation of control unit 130. At process block 405, a transform 210 receives an object and computes a UID for the object. At decision block 410, transform 210 searches its local cache 220 to determine if the object is already available. If the object is stored in local cache 220 transform 210 reuses the object for processing, processing block 415. Thus, there is no need for the transform 210 to communicate with the cache master or any other transform 210.

If the object is not stored in local cache 220, transform 210 transmits a message to the cache master including the object type and UID, processing block 420. Subsequently, the cache master communicates with the transform 210 instructing the transform 210 as to how to proceed. At decision block 425, the transform 210 determines whether this is the first time that any transform controlled by the cache master has received the object. If so, the transform 210 processes the object by performing a raster image process (RIP) to produce a bitmap, processing block 430. Additionally, a record of the object is stored at master database 260.

If it is not the first time the object has been seen, it is determined whether the object has been cached at another transform 210, decision block 435. If the object has not been cached at another transform 210 (e.g., this is the second time the object has been seen), the cache master instructs the transform 210 to RIP and store the object at its local cache 220, processing block 440. The transform 210 will report that it has the object it available in the local cache 220 once the caching is completed.

If, while the caching is in progress, another transform 210 reports the same object, it will be told to RIP the object, rather than caching it, since the first transform 210 is currently caching it and writing to a disk 250. If the object has been cached at another transform 210 the information is retrieved from the other transform 210 and used at the current transform 210, processing block 445.

Since the object may located at a transform 210 at the same node 200, or a transform 210 at another node 200, the current transform 210 receives a message from the cache master indicating which transform 210 the object is to be retrieved from. In either scenario, the current transform 210 opens a socket connection to the transform 210 that has the object in its local cache 220. The current transform 210 receives the control information over the socket.

If the other current transform 210 is not located at the same node 200, the current transform 210 receives the data over the socket as well. The data is subsequently cached on the local disk 250. In one embodiment, the master will use a least-recently used algorithm to assign the other transform 210 for which a current transform 210 is to retrieve an object if multiple transforms 210 have the object stored in cache. The recently used algorithm chooses a transform 210 that has least recently shared any object to share the object. If however a transform 210 located on the same node 200 has the object in its cache 220, that transform 210 will be used in preference to one on another node 200.

According to one embodiment, a transform 210 sends a message to the cache master if the transform 210 needs to delete a resource from the cache to free up space. The cache master may respond by indicating that the object can be deleted, or by indicating that the transform 210 can delete the control information at the local cache 210, but that the data on disk 250 should not be deleted because the object is also used by another transform 210 at the same node 200 that has not yet asked to delete the object. The cache master may also respond with an indication that the transform 210 is not to delete the object since the cache master has told another transform 210 to retrieve the object from the transform 210.

In a further embodiment, cache availability and caching in progress data are used to manage any requests to erase. If multiple transforms 210 on the same node 200 need to erase an object, the last transform 210 to get permission to erase will be instructed to erase the disk cache 250 as well.

Additionally, master database 260 is periodically cleansed of objects that are not in any transform 210 cache (e.g., they have either been seen once or erased). The size of master database 260 is large enough to include the union of all the transform 210 databases, since the worst case is that each instance has seen completely different set of objects.

According to one embodiment, the master thread in the cache master operates serially on socket connections, though multiple threads could be used as well. Therefore record locking is implemented to enable the local transform 210 (e.g., the same process space as the master thread) to access the global database from a different thread. The global cache data is thus locked before use.

The above-described mechanism enables the efficient processing of repeatedly used image objects at a printer.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method comprising:
receiving an object at a first image transform within a control unit;
the first image transform searching for the object in a local cache;
retrieving the object from a second image transform upon a determination that the object been previously received at the control unit and processed at the second image transform by receiving control information associated with the object from the second image transform over a socket; and
the first image transform performing a raster image process on the object upon a determination that the object has not been previously received at the control unit.

2. The method of claim 1 further comprising:
determining if the object has been stored at the second image transform; and
retrieving the object from the second image transform.

3. The method of claim 2 further comprising:
storing the object in the local cache if the object has not been stored at the second image transform; and
reporting to a master transform that the object is available at the local cache.

4. The method of claim 3 further comprising storing a record of the object at a master database.

5. The method of claim 2 wherein retrieving the object further comprises:
receiving a message from a cache master indicating the first image transform is to be retrieved from the second image transform; and
opening the socket between the first image transform and the second image transform.

6. The method of claim 5 further comprising:
the first image transform receiving data associated with the object from the second image transform over the socket if the first image transform and the second image transform are on separate nodes; and
the first image transform receiving data associated with the object from a local disk if the first image transform and the second image transform are on the same node.

7. The method of claim 6 further comprising storing the data associated with the object to local disk upon receiving the data from the second image transform.

8. The method of claim 1 further comprising the first image transform re-using previously processed data corresponding to the object stored in the local cache.

9. A printing system comprising:
a print server; and
a printer comprising:
a print head; and
a control unit having:
a cache master transform;
a second image transform; and
a first image transform to search for a received object in a local cache, to retrieve the object from the second image transform upon a determination that the object been previously received at the control unit by receiving control information associated with the object from the second image transform over a socket and processed at the second image transform and to perform a raster image process on the object upon a determination that the object has not been previously received at the control unit.

10. The printing system of claim 9 wherein the first image transform stores the object in the local cache if the object has been received at the control unit and has not been stored at the second image transform.

11. The printing system of claim 10 wherein the first image transform reports to the cache master transform that the object is available at the local cache.

12. The printing system of claim 11 further comprising a master database coupled to the cache master transform to store a record of the object.

13. The printing system of claim 10 wherein the first image transform retrieves the object by receiving a message from the cache master transform indicating the first image transform is to be retrieved from the second image transform and opening a socket between the first image transform and the second image transform.

14. The printing system of claim 13 further comprising a local disk coupled to the first image transform to store data associated with the object.

15. The printing system of claim 14 wherein the first image transform receives the data from the second image transform over the socket if the first image transform and the second image transform are on separate nodes and receives the data from the local disk if the first image transform and the second image transform are on the same node.

16. The printing system of claim 15 wherein the first image transform stores the data to the local disk upon receiving the data from the second image transform via the socket.

17. An article of manufacture comprising a non-transitory machine-readable medium including data that, when accessed by a machine, cause the machine to perform operations comprising:
receiving an object at a first image transform within a control unit; the first image transform searching for the object in a local cache;
retrieving the object from a second image transform upon a determination that the object been previously received at the control unit and processed at the second image transform by receiving control information associated with the object from the second image transform over a socket; and
the first image transform performing a raster image process on the object upon a determination that the object has not been previously received at the control unit.

18. The article of manufacture of claim 17 wherein the non-transitory machine-readable medium includes data that causes the machine to perform further operations comprising:
determining if the object has been stored at the second image transform; and
retrieving the object from the second image transform.

19. The article of manufacture of claim 18 wherein the non-transitory machine-readable medium includes data that causes the machine to perform further operations comprising:
receiving a message from a cache master indicating the first image transform is to be retrieved from the second image transform; and
opening the socket between the first image transform and the second image transform.

20. The article of manufacture of claim 19 wherein the non-transitory machine-readable medium includes data that causes the machine to perform further operations comprising:
the first image transform receiving data associated with the object from the second image transform over the socket if the first image transform and the second image transform are on separate nodes; and
the first image transform receiving data associated with the object from a local disk if the first image transform and the second image transform are on the same node.

* * * * *